No. 844,715. PATENTED FEB. 19, 1907.
A. A. DUNHAM.
EVAPORATOR.
APPLICATION FILED OCT. 14, 1904.

UNITED STATES PATENT OFFICE.

ANDREW A. DUNHAM, OF ADAMS, NEW YORK, ASSIGNOR TO CASEIN COMPANY OF AMERICA, A CORPORATION OF NEW JERSEY.

EVAPORATOR.

No. 844,715.   Specification of Letters Patent.   Patented Feb. 19, 1907.

Application filed October 14, 1904. Serial No. 228,442.

*To all whom it may concern:*

Be it known that I, ANDREW A. DUNHAM, a citizen of the United States, residing at Adams, in the county of Jefferson and State of New York, have invented certain new and useful Improvements in Evaporators, of which the following is a specification, reference being had therein to the accompanying drawings.

This invention relates to that class of evaporators or drying-machines—such, for example, as is shown by United States Patent No. 631,568—in which two hollow steam-heated rollers or cylinders are arranged to receive the liquid or semiliquid material to be evaporated and from which the dried material is removed in thin films by stationary "doctors" or scrapers.

The present invention relates more particularly to means by which the feed of the liquid or semiliquid material to be evaporated can be better controlled than heretofore, as will hereinafter appear.

Figure 1:
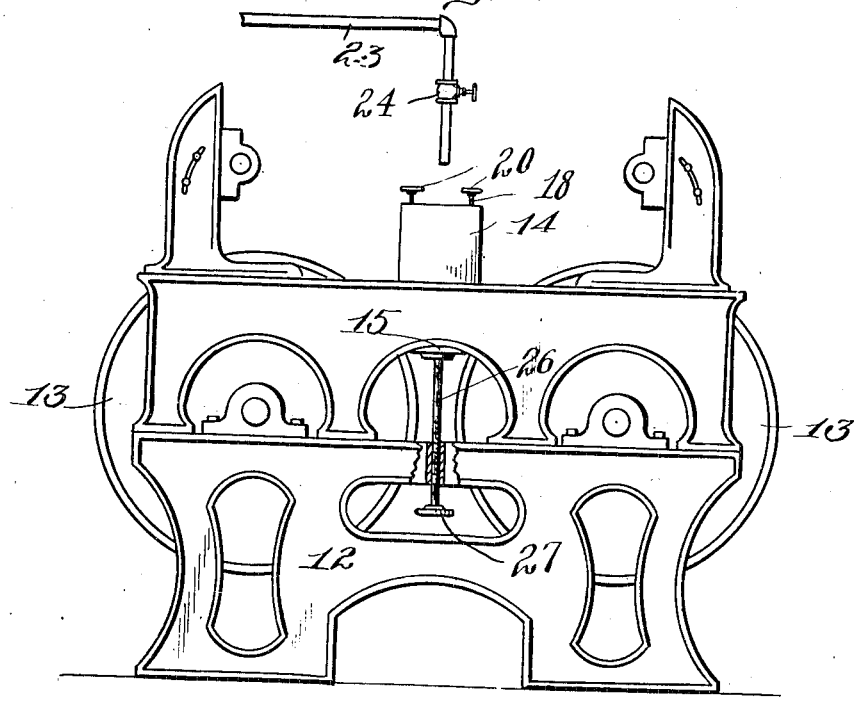
Figure 2:
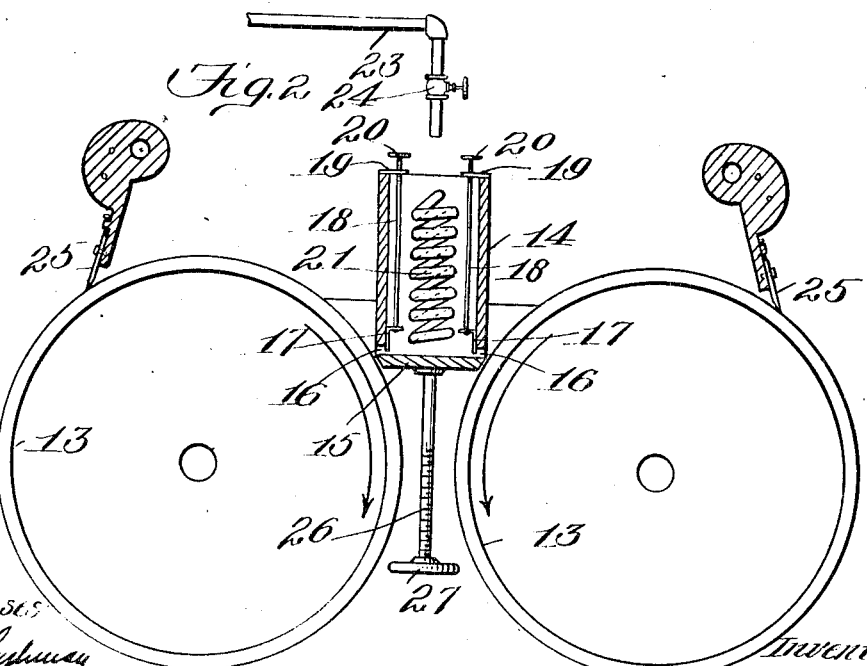

In the accompanying drawings, Figure 1 is a side view of an evaporator embodying the present invention, and Fig. 2 is a partial sectional view of the same.

Referring to the drawings, 12 denotes a suitable frame in which are mounted two hollow rotating rolls or cylinders 13 to be heated by steam in a well-known manner, these cylinders being driven, as usual, so as to rotate downward toward each other at their adjacent faces. In the machines of this class as heretofore constructed the cylinders are arranged with their faces in contact, or practically so, with each other, and the material to be evaporated is held in the "pinch" between the cylinders. For some uses, however, this is found to be objectionable in that the temperature of the liquid to be evaporated cannot be properly controlled nor can the feed of the material to the cylinders be properly regulated. In the present improved machine the material to be evaporated is held in a tank 14, which is adjustably sustained on the frame of the machine, so that the bottom board 15 of the tank may be located at any desired degree of proximity to the drying-cylinders, the sides of said bottom board adjacent to said cylinders being concaved or beveled to correspond to the contour of the cylinders, as shown in Fig. 2. Feed-openings 16 are provided at the sides of the tank, and these feed-openings are provided with adjustable gates 17, controlled by regulating-screws 18, swiveled to said gates and tapped in plates 19 at the top of the tank, said screws being provided with heads 20, by which they may be turned to adjust the said gates vertically. The tank 14 is preferably provided with a coil or coils 21, which may be connected either with a heating medium, as a steam-supply, or with a refrigerating-supply, so that the temperature of the liquid in the tank may be controlled as may be desirable for different purposes. The liquid to be evaporated is supplied to the tank through a pipe 23, provided with a hand-valve 24. The evaporating material is removed from the cylinders by stationary doctors or scrapers 25, preferably adjustably connected with the frame of the machine, in a well-known manner. The tank 14 is supported on the frame of the machine by screw-rods 26, provided with hand-wheels 27, by which they may be turned to raise or lower the tank to any desired position.

In the use of this improved machine the tank 14 will be adjusted to any desired position, so that the bottom board 15 of the tank will have its edges in any desired degree of proximity to the rotating drying-cylinders. For some kinds of material a much more rapid feed of the material to the drying-cylinders is desirable than with some other kinds of materials, and the adjustability of the tank by which the space between the edges of the said bottom board and the surfaces of the cylinders may be varied is therefore important. Also in the evaporation of some kinds of material it is sometimes desirable to have a considerable quantity of the liquid to be evaporated held in the space afforded between the walls of the tank and the cylinders, and the quantity of material thus held in those spaces, as also the feed of the material to the cylinders generally, can be regulated by raising or lowering the gates 17 by means of the screws 18. By the use of a separate tank for holding the material to be evaporated and from which such material is fed to the cylinders a very considerable larger amount of the surface of the drying-cylinders may be utilized for the purpose of evaporation than is possible when the material to be evaporated is held in the pinch between contiguous cylinders, it being of course apparent that no perceptible evaporation on the surfaces of the cylinders occurs until such surfaces shall have passed by the liquid-containing receptacle afforded by the pinch of the cylinders, in the old construction. In the present improved construction the liquid may be fed to the evaporating-cylinders much higher up than in the old construction, and consequently with a resulting gain of considerable evaporating-surface on the cylinders. Also in the present improved construction the temperature of the liquid to be evaporated may be controlled by means of the heating or cooling coils, and if the said coils be heated to a high degree the liquid in the tank may be boiled and considerable evaporation thus carried on before the final evaporating operation on the cylinders.

Having thus described my invention, I claim and desire to secure by Letters Patent—

1. In an evaporating apparatus, the combination with two evaporating-cylinders arranged adjacent to but spaced apart from each other, of a separate supply-tank arranged closely adjacent to and between said cylinders and the outer walls of which, and the surfaces of said cylinders, form receptacles for holding the material to be evaporated, said supply-tank being vertically adjustable so that its bottom may be brought into any desired degree of proximity to the said cylinders.

2. In an evaporating apparatus, the combination with two evaporating-cylinders arranged adjacent to but spaced apart from each other, of a separate supply-tank arranged between said cylinders and from which the material to be evaporated is fed to the cylinders, said supply-tank being provided with means for varying or regulating the temperature of the material held therein.

In testimony whereof I affix my signature in presence of two witnesses.

ANDREW A. DUNHAM.

Witnesses:
HENRY CALVER,
A. O. CUSHMAN.